United States Patent [19]
Palan et al.

[11] Patent Number: 5,877,663
[45] Date of Patent: Mar. 2, 1999

[54] MICROWAVE WAVEGUIDE FOR TANK LEVEL SENSORS

[75] Inventors: Donald F. Palan, Chaska; Jon D. Miller, Eagan, both of Minn.

[73] Assignee: Rosemount Inc., Eden Prairie, Minn.

[21] Appl. No.: 926,294

[22] Filed: Sep. 5, 1997

Related U.S. Application Data

[63] Continuation of Ser. No. 536,471, Sep. 29, 1995, abandoned.

[51] Int. Cl.$^6$ .............................. H01P 1/08; G01F 23/28
[52] U.S. Cl. ......................... 333/252; 333/34; 333/254; 73/290 V; 324/644
[58] Field of Search ............................... 333/33, 34, 248, 333/250, 252, 254; 324/637, 642, 644; 73/290 V

[56] References Cited

U.S. PATENT DOCUMENTS

| | | | |
|---|---|---|---|
| 3,001,160 | 9/1961 | Trousdale | 333/252 |
| 4,101,865 | 7/1978 | Schurr | 73/290 V |
| 4,201,956 | 5/1980 | Kienberger et al. | 331/96 |
| 4,210,915 | 7/1980 | Kienberger et al. | 343/786 |
| 4,688,009 | 8/1987 | Ferguson et al. | 333/252 |
| 5,279,156 | 1/1994 | van der Pol | 333/252 X |
| 5,495,218 | 2/1996 | Erb et al. | 333/248 |

FOREIGN PATENT DOCUMENTS

| | | |
|---|---|---|
| 32 14 487 A1 | 10/1983 | Germany . |
| 5136601 | 6/1993 | Japan . |
| 2187336 | 9/1987 | United Kingdom .................. 333/252 |
| WO 90/12292 | 10/1990 | WIPO . |

OTHER PUBLICATIONS

Skektch—Figure 1, A–1—Aug. 3,1994 DP—Exploded view of Electronic housing to antenna coupling (admitted prior art) public use prior to Aug. 3, 1994.

"Guiding the way through micropilot", Endress & Hauser published Nov. 1993.

*Primary Examiner*—Benny Lee
*Assistant Examiner*—Barbara Summons
*Attorney, Agent, or Firm*—Westman, Champlin & Kelly, P.A.

[57] ABSTRACT

A process sealed waveguide is formed in a flange mounted on a tank, and is used for transmitting microwave energy from a source of microwave energy to an aperture of an antenna on the interior of the tank. The process sealed waveguide includes a mechanical barrier to prevent escape of fluid under pressure or liquid from the interior of the tank, and also serves to reduce impedance mismatch between the air, vapor, or liquid filled waveguide or antenna apertures. The flange is mated to the microwave source through an electronic housing to flange adapter that interfaces with the flange in a manner to provide a vent in case the mechanical barrier fails so pressure is released, and to provide flame quenching if flames are present. The adapter includes a second waveguide having a process sealed mechanical barrier mounted coaxially with the mechanical barrier in the waveguide in the flange.

26 Claims, 4 Drawing Sheets

MICROWAVE WAVEGUIDE FOR TANK LEVEL SENSORS

This is a continuation of application Ser. No. 08/536,471, filed Sep. 29, 1995, now abandoned.

BACKGROUND OF THE INVENTION

The present invention relates to a process sealed microwave waveguide for use with a tank level sensor. The process sealed waveguide serves as a pathway for transmitting microwave energy from a microwave source through an explosion proof/flame proof process seal interface to an antenna. This device is particularly useful in instruments that determine product levels in tanks.

Radar level gauges are in wide use for measuring the level of products in tanks. Process fluids contained in tanks range from benign products to severely corrosive or abrasive compounds. The operating restriction that is present is that the product contained in the tank must have a dielectric constant high enough to cause microwave signal reflection which can be received by the gauge. Antenna and waveguide assemblies that are used also have to be capable of containing the process pressures in the tanks in order to isolate the gauge electronics from the process vapors and fluids.

It is important that the level gauge waveguide contain process pressures both in terms of preventing damage to the gauge electronics and in terms of preserving the tank's ability to contain process pressures. An additional design constraint for microwave level gauges used in process applications that are considered to be hazardous locations are explosion proof/flame proof certification requirements. These requirements come from standards developed by various representatives of industry, government, and certifying agencies. The need for containing an internal explosion of a specific flammable vapor-air mixture and not allowing the propagation of ignition temperature gasses to the external environment is set forth in the standards. At the present time, meeting the design requirements of these explosion proof/flame proof standards has required very precise manufacturing processes and the addition of high precision components. This results in greater labor and material costs to be placed on an instrument already significantly constrained by microwave performance criteria that must be met for proper gauge operation. More specifically, the waveguide or pathway from the electronics or microwave source must include an explosion proof/flame proof seal as well as serve as a microwave signal pathway.

One existing solution to the problem includes separating the gauge into two assemblies: one being the antenna/microwave sensor assembly and the other the electronics assembly. During installation of this gauge, the antenna/microwave sensor assembly is assembled to the tank with a separate process seal. The electronics assembly contains the circuitry for power regulation, signal processing, communications, and the level and volume calculations and corrections. The antenna/microwave sensor assembly is a very low power device that transmits and receives microwave signals. The spacing between the components used in the antenna/microwave sensor assembly electronics and the low power level permit the assembly to meet the requisites for intrinsically safe instrumentation. However, even with the separated level gauge components there is still a need for the process seal between the sensor and the potentially aggressive products inside the tank.

Another method of avoiding the explosion proof/flame proof requirements at the interface of the source of the microwave signal and the antenna, is to encapsulate the antenna inside an agency approved epoxy, RTV or glass. In order for this to be feasible the antenna must be small or the additional epoxy required and extensive housing modifications would make the gauge design quite expensive. When the antenna is encapsulated inside epoxy, the customer has two mounting options, namely the microwave level gauge can be mounted directly on the tank or the gauge can be mounted on a "window" covering an opening or port in the tank. Both the window and the gauge must be designed to meet material, safety certification, microwave performance, and process seal requirements.

However, the need still exists for a low cost, effective, and high performance process sealed waveguide assembly that fulfills the microwave signal transmission requirements, acts as a process seal, and meets the explosion proof/flame proof certification requirements.

SUMMARY OF THE INVENTION

The present invention relates to a microwave signal transmission device for transmitting microwave energy from a source through an opening or port in a tank or other vessel, and is comprised of a process sealed waveguide acting as a microwave transmission line at the working frequency and power output of the gauge and which serves as a mechanical barrier for preventing pressure leakage.

The process sealed waveguide is characterized by part geometry which provides impedance matching with the antenna to avoid reflections, resonance, and similar microwave signal problems. Impedance matching reduces inefficiencies, losses and false target returns.

Microwave electronics are now capable of operating at 24 GHz, which is more than twice as high as the operative frequency of presently existing gauges. High frequency microwave signals permit reducing the cross sectional area of the waveguide, whether it is circular or rectangular, without losing microwave signal propagation. This reduction in size allows for the creation of a physically small, microwave transparent mechanical barrier that can be secured in the waveguide. The cross sectional area of this barrier is sufficiently small enough that for a given material the ability of the waveguide to withstand process pressure loads is significantly increased. The primary process sealed waveguide is formed by securing a barrier in a correctly sized waveguide aperture placed in a flange that covers a port or opening of a vessel or tank. A waveguide that is circular in cross section is preferred and is easier to manufacture with regard to tolerance control of size, particularly in the securing hub or joint area of the barrier.

The mechanical joint supporting the barrier in the waveguide is made sufficiently strong to withstand the process pressures without failure so that the process pressure is maintained in the tank or vessel and is sealed from the electronic microwave source. The barrier also has to withstand the operating temperature requirements as well as being resistant to any corrosive process fluids they might contact. The barrier preferably has a tapered end, formed conically, as shown, to aid in impedance matching. The tapered end can be truncated rather than sharp, or the barrier can be a full cylinder, except reflection is a problem with flat surfaces.

Certification of the microwave gauge and process sealed waveguide is achieved by careful control of flamepaths and pressure retaining joints to meet certification standards. In addition, the process sealed waveguide will be subjected to hydrostatic pressure testing as a routine manufacturing step.

In the embodiment shown, there is an adapter plate or housing to flange transition between the microwave source and the flange, which has a waveguide aperture for receiving a second barrier forming a secondary process seal that in this case is identical to the primary seal, but inverted so that the tapered portion of the barrier is facing the other direction in the waveguide.

In order to meet the most stringent of the certification requirements on the microwave gauge, the embodiment shown also includes a non-flame propagating pressure relief joint or vent path area between the mechanical barriers. This vent path is carefully tested by certification agencies to insure that in the event of a primary mechanical barrier failure in the waveguide, pressure is relieved before it reaches the secondary barrier without flame propagation in either direction; out of the gauge or into the tank.

The length of the taper or transition section of the mechanical barrier indicated is on the order of one waveguide wavelength in length, while more conservative design estimates indicate the taper length should be as long as two waveguide wavelengths if possible.

Materials useful for construction of the mechanical barrier include tetrafluoroethylene, low dielectric constant and low dissipation factor thermoplastics, quartz, glass and ceramic materials. Good mechanical strength, low dielectric constant, low loss tangent or dissipation factor, chemical stability, and good corrosion resistance are desired material properties. One preferred material is ceramic, of which several types exhibit the properties listed above. In particular, aluminum oxide, the purer the better, is satisfactory and a mechanical barrier made of this material can be brazed in place to form a very good process sealed waveguide. 99.5% pure through pure (synthetic sapphire) alumina oxide has been used.

The present invention provides a redundant barrier design, and creates a pressure relief joint or venting region between the primary and secondary barriers in the process sealed waveguide, to satisfy the most difficult of the certification requirements. An explosion proof/flame proof process sealed waveguide is thus provided.

DETAILED DESCRIPTION OF THE PREFERRED EMBODIMENTS

Figure 1:
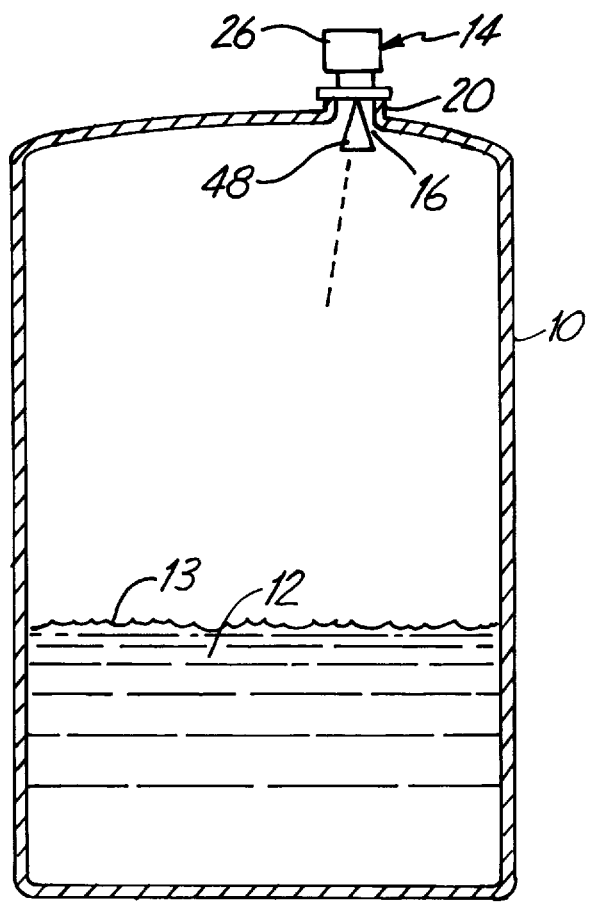
FIG. 1 is schematic representation of a tank in which a microwave tank level indicator having a process sealed waveguide made according to the present invention is installed.

Referring to FIG. 1, a process tank indicated generally at 10 is filled with a liquid 12, the height or level of which is to be determined utilizing a microwave level sensor assembly 14. The level sensor assembly 14 is mounted on a tank port 16 at the top of the tank, and is sealed relative thereto. The microwave level sensor transmits microwave energy through the port, along a waveguide and will receive reflected energy from the liquid surface 13 to provide an indication of the level of this liquid within the tank. The electronics that are used for transmitting the microwave energy, and receiving the reflections are well known, and are shown only schematically.

Figure 2:
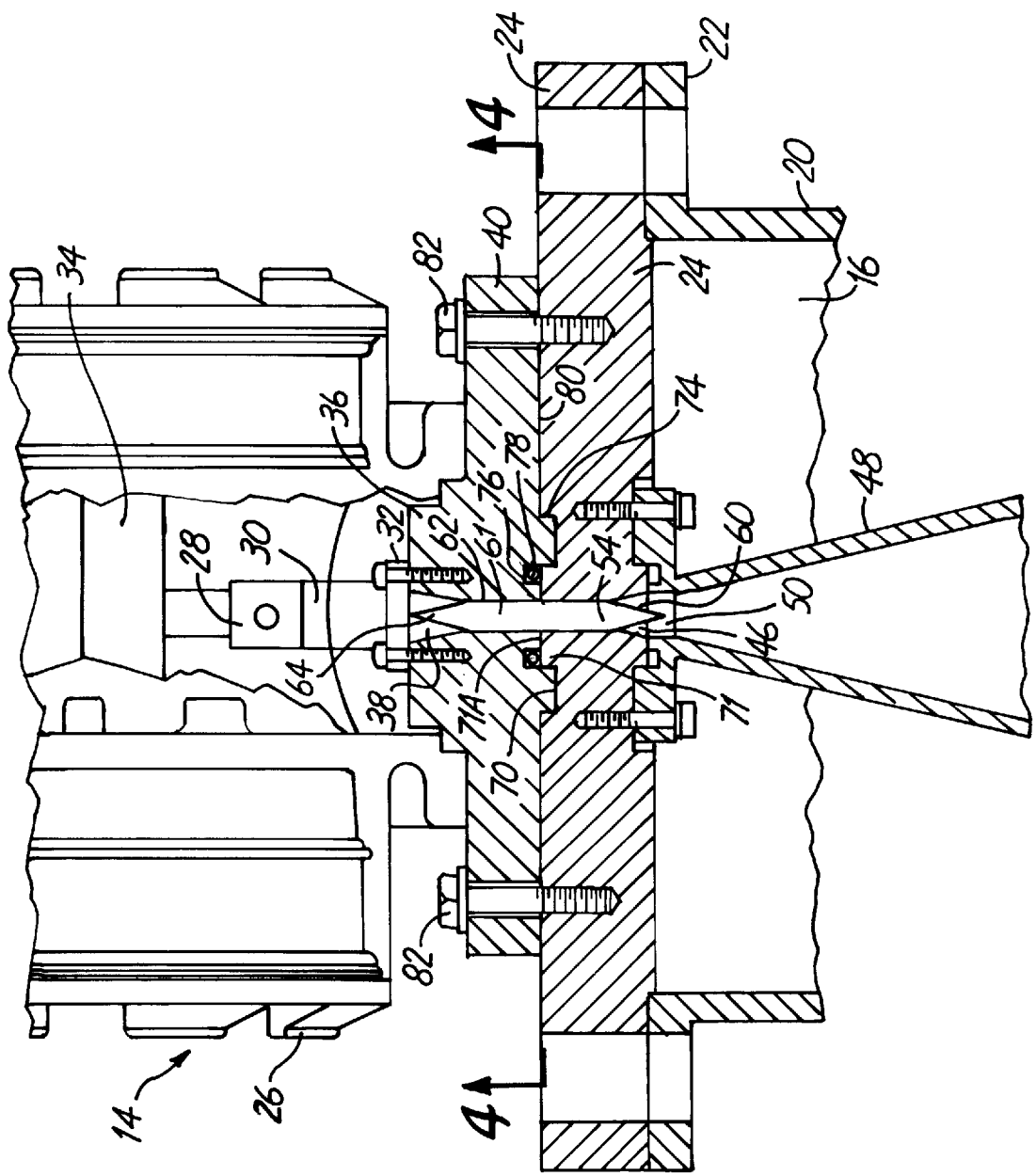
FIG. 2 is an enlarged cross sectional view of a microwave source and antenna coupled through a process sealed waveguide made according to the present invention.

Referring to FIG. 2, the microwave level sensor assembly 14 is illustrated.

It is mounted onto a standoff pipe 20 fastened to the top of the tank 10 (see FIG. 1) around port 16. Fastened to standoff pipe 20 is the tank flange 22.

A level sensor assembly mounting flange or support 24 is secured with bolts to tank flange 22 and is sealed with a suitable gasket. The mounting flange 24 is used for supporting both the housing to flange adapter 40 and the electronics housing 26 which includes microwave source circuitry of conventional design shown at 34. The microwave source circuitry 34 provides microwave energy through a coaxial connection indicated generally at 28 that is coupled to a coaxial to rectangular waveguide adapter 30 within the electronics housing 26. The coaxial to rectangular waveguide adapter 30 is secured with screws to a raised boss 36 of the housing flange adapter 40 via the coaxial to rectangular waveguide adapter mounting bracket 32.

A waveguide aperture 38 is formed in adapter plate 40 and is aligned with adapter 30. Waveguide aperture 38 is in the form of an upwardly expanding circular to rectangularly shaped hole. Adapter plate 40 is secured to the mounting flange 24, with bolts of selected size and torqued to a level selected to permit some elastic yielding if pressure between the secondary barrier 62 and primary barrier 54 exceeds a predetermined level. Waveguide aperture 46 in the center of mounting flange 24 aligns with waveguide aperture 38, so that microwave energy transmitted through the waveguide adapter 30 is transmitted through the aligned waveguide apertures. Waveguide aperture 46 is in the form of a downwardly expanding circular cone.

A suitable antenna 48 is mounted on the bottom side of the flange 24, and is positioned within the port 16. The antenna 48 is of conventional design and includes a central aperture 50 at an upper end that aligns with waveguide aperture 46 in the flange 24, and thus aligns with the waveguide aperture 38 in the adapter plate 40.

In order to provide a barrier for vapors or liquids that are in the interior of the tank 10 (see FIG. 1) and to prevent the vapors from being discharged to the exterior, a low dielectric mechanical barrier 54 is suitably secured in the waveguide aperture 46 and forms a primary mechanical, pressure tight barrier. The low dielectric mechanical barrier 54, as shown in FIG. 2, is an elongated barrier member having a generally cylindrical base or hub end shown at 58, and a conically tapered or pointed transition and impedance matching section 60 (see FIG. 2). When made of tetrafluoroethylene, the base end 58 of the low dielectric mechanical barrier 54 can be formed with an irregular surface to aid in providing a solid mechanical joint between the surface of the upper end of waveguide aperture 46 and the base end 58 of the barrier when the barrier is epoxied in place in the waveguide aperture 46 of mounting flange 24. When the low dielectric mechanical barrier 54 is made of aluminum oxide, then the base end 58 does not require the irregular shape and it can be brazed in the waveguide aperture 46 of mounting flange 24.

The portion of the aperture 46 holding the hub end 58 of the barrier 54 may be slightly tapered in upward direction. This will result in pressure from the tank tending to urge the hub to seat more tightly in the aperture.

Referring to FIG. 2, the tapered or pointed end section 60 of the low dielectric mechanical barrier 54 forms a transition section for impedance matching with the air or vapor filled antenna 48. The length of the low dielectric mechanical barrier tapered section 60 is measured from the base end 58 to the outer tip of the tapered end section 60 and should conservatively be in the range of two waveguide wavelengths long, the lengths on the order of one waveguide wavelength have been used successfully.

If the low dielectric mechanical barrier 54 is made of tetrafluoroethylene, an epoxy or other bonding material will be used in the hub or joint area between the base end 58 of the low dielectric mechanical barrier and the surface of waveguide aperture 46 to hold the mechanical barrier 54 sealed in position and therefore blocking the transmission of gasses or liquids through the waveguide aperture 46. Brazing an aluminum oxide mechanical barrier into the waveguide aperture 46 also provides a secure mechanical barrier as needed.

The low dielectric mechanical barrier 54 forms a primary mechanical barrier against transmission of vapors, fluids, or materials under pressure from tank 10 (see FIG. 1).

A second low dielectric mechanical barrier 62 forms a secondary mechanical barrier and is positioned in waveguide aperture 38 of the housing to flange adapter plate 40. It is made identical to low dielectric mechanical barrier 54, but the whole barrier is inverted so that the tapered end section 64 is flipped relative to the low dielectric mechanical barrier 54. The second low dielectric mechanical barrier 62 has a base end 61 and a tapered or pointed end 64 similar to that shown at 60, but is directed upwardly into waveguide aperture 38. The tapered end is close to the coaxial to rectangular waveguide transition 30 in the electronics housing 26 which houses the microwave energy source 34. This tapered or pointed end section 64 forms a transition section to aid in impedance matching with the air-filled coaxial to rectangular waveguide adapter 30. The base end of low dielectric mechanical barrier 62 and the base end of low dielectric barrier 54 concentrically abut for waveguide continuity, but they are not fastened together.

The tapered end sections of the barriers may be truncated to have flat ends, or can be cylindrical for the full length of the barrier, if reflections that occur with flat surfaces are not problem.

The low dielectric mechanical barriers 54 and 62 forming primary and secondary process sealed waveguide mechanical barriers are made of a low dielectric material, such as tetrafluoroethylene, or a low dielectric constant and low dissipation factor thermoplastic, quartz, glass and ceramic materials. The diameter of the mechanical barriers and the waveguides apertures is primarily determined by both the wavelength of the microwave signal being transmitted and the dielectric constant of the barrier materials.

As an example of the general microwave formulas that apply to waveguides and antennas, the following formulas indicate how beam width is a function of the frequency of the signal, and the antenna diameter (using metric units):

$$\lambda = c/f$$
$$\text{Beam Width} = 70 * \lambda/\phi$$
$$= 70 * (c/f)/\phi$$

Where $\lambda$=wavelength of the microwave signal, f=frequency of the microwave signal, c=speed of light ($3 * 10^8$ m/s), and $\phi$=the diameter of the antenna.

Another important equation is the relationship between the radius of the waveguide (a), the longest wavelength ($\lambda_c$) that can be transmitted by the dielectric filled waveguide, and the dielectric constant ($\epsilon$) of the barrier material:

$$\lambda_c = \sqrt{\epsilon} * (2 * \pi * a)/1.841$$

(using metric units)

Figure 4:
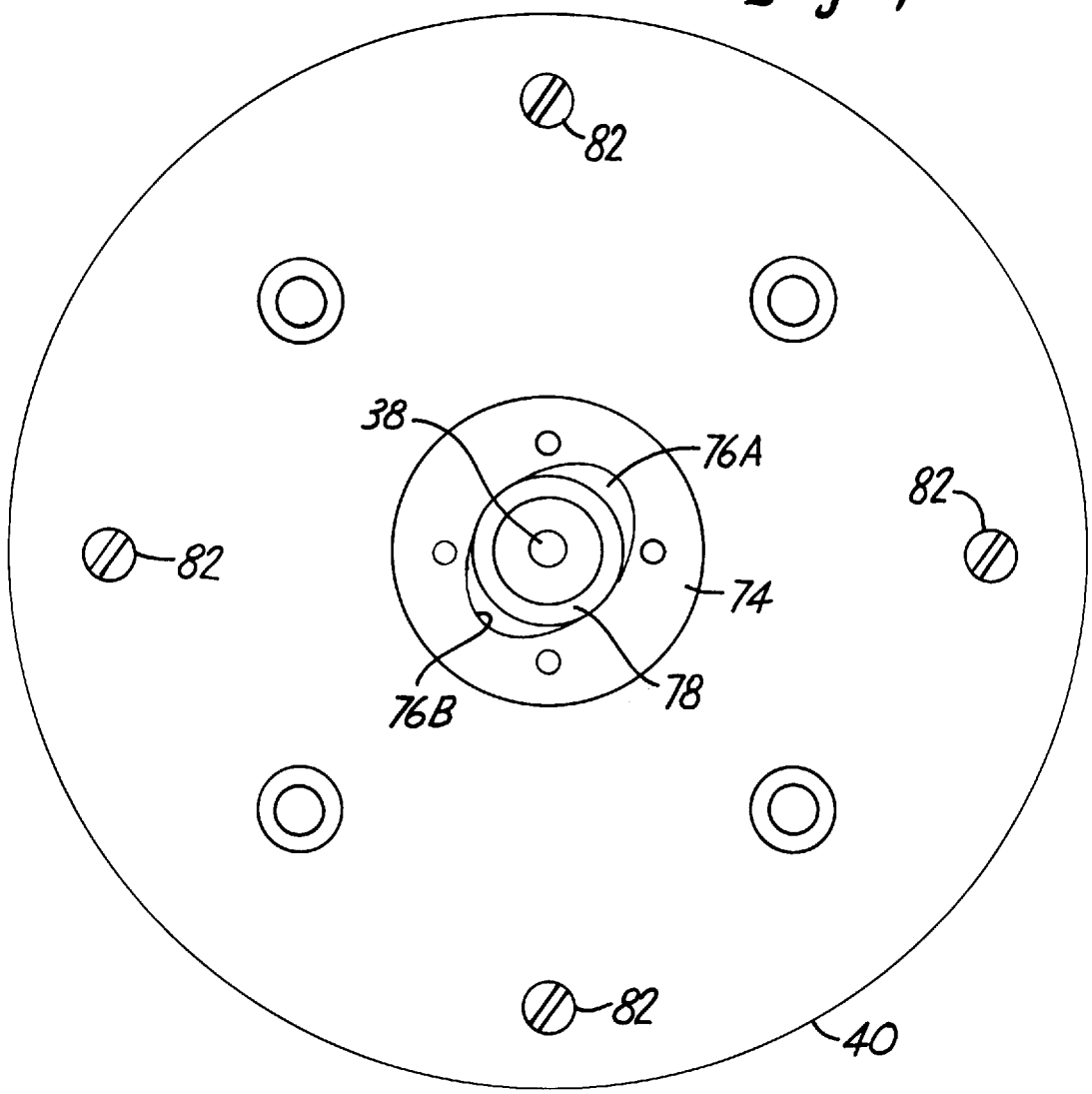
FIG. 4 is a plan view of the flange mating surface of an adapter plate taken along line 4—4 in FIG. 2.

The interface formed by the mating surfaces of the housing to flange adapter 40 and the mounting flange 24 as shown in FIGS. 2 and 4 forms a long vent path from the central waveguide apertures by appropriately designing the outer diameter of the housing flange adapter 40 to create the long vent pathway. The mating surfaces between the housing to flange adapter 40 and the mounting flange 24 form a sufficiently long pathway from the process sealed waveguide aperture 46 to the atmosphere for venting gasses or vapors without allowing flame propagation in either direction. The secondary process sealed waveguide barrier 62 prevents flame propagation into the waveguide aperture 38 and therefore into electronics housing 26. The design of housing to flange adapter 40 can be adjusted to meet explosion proof/flame proof certification requirements.

It should be noted that flame propagation is prevented in two paths, past the secondary process sealed waveguide barrier 62 and between the facing surfaces of the housing to flange adapter 40 and mounting flange 24. The flames are also prevented from propagating from the exterior, such as from the electronics housing 26 into the antenna opening or from the exterior of the mounting flange 24, inwardly.

As shown in FIGS. 2 and 4 the mounting flange 24 and housing to flange adapter 40 are configured with an O-ring interface that is designated to as pressure ingress protection, but permits hot or pressurized gasses to escape through the vent pathway that occurs at the interface between the mating surfaces of the housing to flange adapter 40 and the mounting flange 24.

The mounting flange 24 has an annular recess 70 that defines a concentric ring 71 in its center. The housing to flange adapter 40 has a raised concentric ring 74 that fits within the annular recess 70 of the mounting flange and includes a concentric O-ring groove 76 in which an O-ring 78 is placed, and the O-ring 78 compressed onto the upper surface 71A of the mounting flange concentric ring 71.

As shown in FIG. 4, the O-ring groove 76 has a pair of lobes 76A and 76B, which create widened areas in the O-ring groove 76. In the event of a failure of the primary process seal 54, pressure will cause the O-ring 78 to expand into the lobes 76A or 76B at predetermined low pressures. When that happens the O-ring 78 travels sufficiently far to clear the edge of the flange concentric ring 71 and no longer seals to surface 71A. This movement releases or vents the pressure to the mating surfaces of the housing to flange adapter 40 and mounting flange 24. The process vapors, hot gasses, or pressurized liquids can safely escape through the relatively long distance between the central process sealed waveguide apertures and the outer edge of the housing to flange adapter 40. This path is represented in FIG. 2 by a dark line 80.

Bolts or capscrews 82 which are used for fastening the housing to flange adapter 40 in position are kept at a known predetermined low torque so that the plate will elastically stretch the bolts 82 and permit the venting separation to occur. The separation is controlled to be only a thin space to quench flames before the flames reach the atmosphere.

Figure 3:
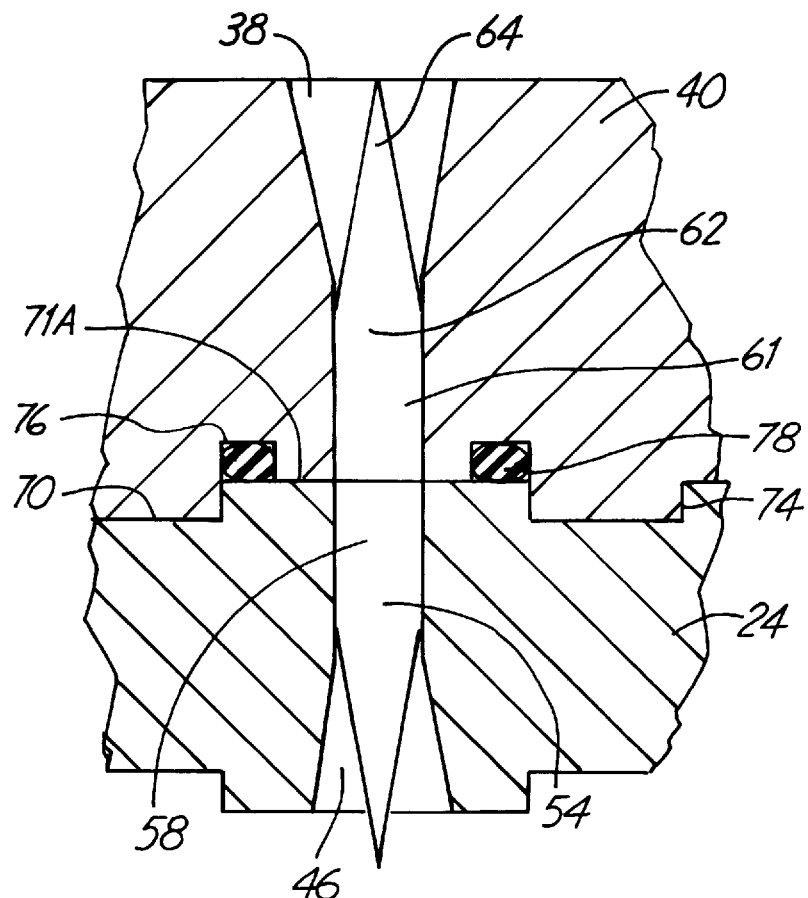
FIG. 3 is an enlarged sectional view of a process sealed waveguide made according to the present invention.

Referring to FIG. 3, if the process sealed waveguide barriers 54 and 62 are epoxied into the waveguide apertures 46 and 38, the length of the epoxy joint at the base ends 58 and 61 must be greater than ten millimeters to meet certification requirements, and irregularities should be formed on the hubs 58 and 61. The epoxy selected must meet mechanical and operating temperature requirements for the gauge as well as matching the electrical and microwave parameter for the waveguide. At the certification agencies the epoxy must pass flammability, aging and chemical compatibility testing. When quartz and ceramic materials are used for the primary and secondary mechanical barriers, the joints between the barriers and waveguide apertures can be a combination press fit and shrink fit, and then brazed, or simply only a brazed joint. Placement of the braze is carefully controlled to protect the integrity of the impedance matching.

The fitting and assembly of the ceramic mechanical barriers can be done by heating the mounting flange 24 (or housing to flange adapter plate 40) and inserting the ceramic mechanical barrier into the corresponding waveguide aperture which has been expanded by the application of heat. An initial interference fit is provided during insertion of the barriers into apertures of the heated mounting flange 24 or housing to flange adapter 40, and when the flange or plate cools, it shrinks even more tightly onto the ceramic mechanical barrier, which has a lower coefficient of thermal expansion. Brazing at the base end of the ceramic mechanical barrier then finishes the assembly process. An interference fit forms a compression joint.

In selecting the material for the low dielectric mechanical barrier, the lower the dielectric constant is preferred as long as consideration is also given to the material strength properties. Assuming a 24 GHz signal, a lower dielectric, low dissipation factor material permits construction of a larger diameter waveguide while minimizing losses due to impedance mismatching, discontinuities and the like. As dielectric constants increase the diameter must decrease to maintain the same frequency performance and creates manufacturing difficulties due to small physical size and tightness of waveguide component tolerances.

The venting provided by permitting the O-ring 78 to extrude into lobes 76A and 76B (see FIG. 4), and allowing a separation gap between mounting flange 24 and housing to flange adapter 48 as the capscrews or bolts stretch must occur at a lower pressure than the pressure that caused a failure of the primary mechanical process seal 54. For example, if the primary process seal 54 fails at 100 psi process pressure, the venting between the mounting flange 24 and housing to flange adapter 40 should occur at a substantially lower pressure than 100 psi to protect the secondary seal from the full force of the process pressure. This insures that the process pressure is safely released along a long, flame quenching path before the secondary barrier releases or fails.

Although the present invention has been described with reference to preferred embodiments, workers skilled in the art will recognize that changes may be made in form and detail without departing from the spirit and scope of the invention.

What is claimed is:

1. A process sealed waveguide device for transmitting microwave energy from a microwave source supported on a support member to an antenna through the waveguide device, comprising;
   a waveguide aperture in the support coupled to the microwave source and antenna; and
   a waveguide barrier carried in said aperture placed between the microwave source and the antenna having a hub portion sealed and secured in said aperture with a compression joint between surface portions defining the aperture and the hub portion to form a fluid seal.

2. The process sealed waveguide device of claim 1 wherein the support is a flange and including a process sealed housing to flange adapter between the microwave source and the flange, the waveguide barrier comprising a first waveguide barrier in a first aperture, the adapter having a second aperture aligned with the first aperture, and a second waveguide barrier in the second aperture having a second hub portion sealed and secured to surfaces defining the second aperture and having an end adjacent the hub portion of the first waveguide barrier and an elongated portion extending from the second hub portion toward the microwave source.

3. The process sealed waveguide device of claim 2 and an elastic ring seal supported to surround the first aperture, a retainer groove for the elastic ring having a section positioned to permit the elastic ring to move to a non-sealing portion to vent pressurized fluids between facing surfaces of the support flange and flange adapter.

4. The process sealed waveguide device of claim 3, wherein the facing surfaces between the support flange and the flange adapter plate create a pressure vent by separation of the facing surfaces from pressures created on an antenna side of the flange, the flange and adapter being held by fasteners that elastically yield to permit separation of the facing surfaces.

5. The process sealed waveguide device of claim 4, wherein the adapter has the second aperture positioned in a portion of the adapter such that when the facing surfaces separate to form a pressure vent gases vented cool below combustion temperature before reaching an edge of the adapter.

6. The process sealed waveguide device of claim 4, wherein the separation of the facing surfaces occurs at a pressure less than the pressure at which either one of the first and second waveguide barriers release from their respective apertures.

7. The process sealed waveguide device of claim 4, wherein the separation of the facing surfaces is maintained at a close spacing sufficient to quench flames prior to the time the vented fluids enter the atmosphere.

8. The process sealed waveguide device of claim 1, wherein the waveguide barrier comprises a ceramic material.

9. The process sealed waveguide device of claim 8 wherein the ceramic material comprises aluminum oxide.

10. The process sealed waveguide device of claim 8, wherein the ceramic material includes a transition portion that forms an impedance transition of the waveguide barrier and has an axial length less than two wavelengths of the microwave energy.

11. The process sealed waveguide device of claim 1, wherein the waveguide barrier is made of material having the dielectric properties of tetrafluoroethylene.

12. The process sealed waveguide device of claim 1 wherein the compression joint is formed by an interference fit between the surface portions defining the aperture and the hub portion.

13. The process sealed waveguide device of claim 12 wherein the interference fit is created by a press fit between the surface portions defining the aperture and the hub portion.

14. The process sealed waveguide of claim 1 wherein the waveguide barrier comprises a material selected from the group consisting of tetrafluoroethylene, and low dielectric constant and low dissipation factor thermoplastic, quartz, glass and ceramic materials.

15. The process sealed waveguide device of claim 1 wherein the surface portions defining the aperture and hub portion are substantially smooth.

16. The process sealed waveguide device of claim 1 wherein the compression joint comprises a braze between the surface portions defining the aperture and the hub portion.

17. The process sealed waveguide device of claim 16 wherein the braze is formed at the base end of a second low dielectric mechanical barrier.

18. A process sealed microwave waveguide for transmitting microwave energy from a source through a mount on a tank to a microwave antenna on an opposite side of the mount from the microwave source and open to contents of the tank, comprising;

said mount having a microwave waveguide aperture having an axial length aligned with the microwave source and with a second aperture of the antenna for transmission of microwave energy through the waveguide aperture; and a first barrier in said waveguide aperture comprising a solid, low dielectric member having a hub portion sealed and secured to a surface defining the waveguide aperture along an axial length thereof with a compression joint to form a fluid seal.

19. The process sealed waveguide of claim 18 including an adapter between the microwave source and the mount, the adapter having an adapter aperture aligned with the waveguide aperture, and a second solid material barrier secured in the adapter aperture.

20. The process sealed waveguide of claim 19, wherein the mount and adapter have mating surfaces which are clamped together with elastic fasteners, the fasteners elastically yielding to permit the mating surfaces to separate and to create a pressure vent area from excessive pressures created on the antenna side of the mount which causes the first barrier to fail and to permit the pressure from the antenna side of the mount to act on the facing surfaces of the mount and adapter.

21. The process sealed waveguide of claim 20, wherein said first and second barriers both comprise a solid material, generally cylindrical cross section hub secured to surfaces defining one of the first and second apertures, and tapered portions extending away from the hubs and each terminating in a point.

22. The process sealed waveguide device of claim 18 wherein the compression joint is formed by an interference fit between the surface portions defining the aperture and the hub portion.

23. The process sealed waveguide device of claim 22 wherein the interference fit is created by a press fit between the surface portions defining the aperture and the hub portion.

24. The process sealed waveguide device of claim 18 wherein the surface portions defining the aperture and hub portion are substantially smooth.

25. The process sealed waveguide device of claim 18 wherein the compression joint comprises a braze between the surface portions defining the aperture and the hub portion.

26. The process sealed waveguide device of claim 25 wherein the braze is formed at the base end of a second low dielectric mechanical barrier.

* * * * *